Nov. 14, 1950 — R. E. CORNWELL — 2,529,540
HYDRAULIC RESISTANCE BRAKE FOR ROTARY MEMBERS
Filed Aug. 25, 1949 — 4 Sheets-Sheet 2

INVENTOR.
RALPH E. CORNWELL
BY Frederick Diehl
ATTORNEY

Nov. 14, 1950 — R. E. CORNWELL — 2,529,540
HYDRAULIC RESISTANCE BRAKE FOR ROTARY MEMBERS
Filed Aug. 25, 1949 — 4 Sheets-Sheet 3

INVENTOR.
RALPH E. CORNWELL
BY
Frederick Diehl
ATTORNEY

INVENTOR.
RALPH E. CORNWELL
BY
Frederick Diehl
ATTORNEY

Patented Nov. 14, 1950

2,529,540

UNITED STATES PATENT OFFICE 2,529,540

HYDRAULIC RESISTANCE BRAKE FOR ROTARY MEMBERS

Ralph E. Cornwell, La Canada, Calif.

Application August 25, 1949, Serial No. 112,203

9 Claims. (Cl. 188—90)

My present invention relates generally to hydraulic braking mechanisms of the type disclosed and claimed in my United States Letters Patent No. 2,469,632, issued to me on May 10, 1949.

In the above identified patent the invention in its broad aspect is composed of a hydraulic control apparatus, which, in its association with a driven axle or shaft of an automotive vehicle or other form of machine, is structurally characterized by means enabling any degree of service or emergency braking action to be easily, smoothly and accurately applied hydraulically to a rotary driven element, and the same hydraulically locked against rotation; which, in its fully released condition renders the rotary element free for rotation with but negligible fluid drag, so as to avoid generating excessive heat; and which embodies a rotor holding the main body of hydraulic fluid under the action of centrifugal force, in a manner to reduce to a negligible minimum the tendency of fluid to leak from the system when the machine is running with the brake fully released, so that only when pressure is built up in the system by the braking action, or when the machine is at rest, is the need for a fluid-tight system present.

The primary object of my present invention is to provide a hydraulic braking mechanism which has all the advantages of my patented invention; which is materially simplified structurally and functionally to produce a more compact unit of smaller diameter without such projecting parts as might be damaged or broken off by road obstructions or lowering of the unit closer to the road as a result of a flat tire; which embodies a greatly simplified and exteriorly located by-pass valving structure having fewer parts and being much easier to operate; and which enables such heat as is generated to be much more easily dissipated by subjecting the hydraulic fluid to the action of atmospheric air or other cooling agent during circulation of the fluid exteriorly of the unit.

A further object of my present invention is to provide a hydraulic braking mechanism of the above described character which embodies a novel vane structure and means for retaining the vanes thereof in a predetermined operating position in opposition to the action of centrifugal force in tending to shift the vanes from such position.

With these and other objects in view, my invention resides in the combinations, arrangements and functional relationships of elements as set forth in the following specification and particularly pointed out in the appended claims.

In the accompanying drawings.

Figure 1:
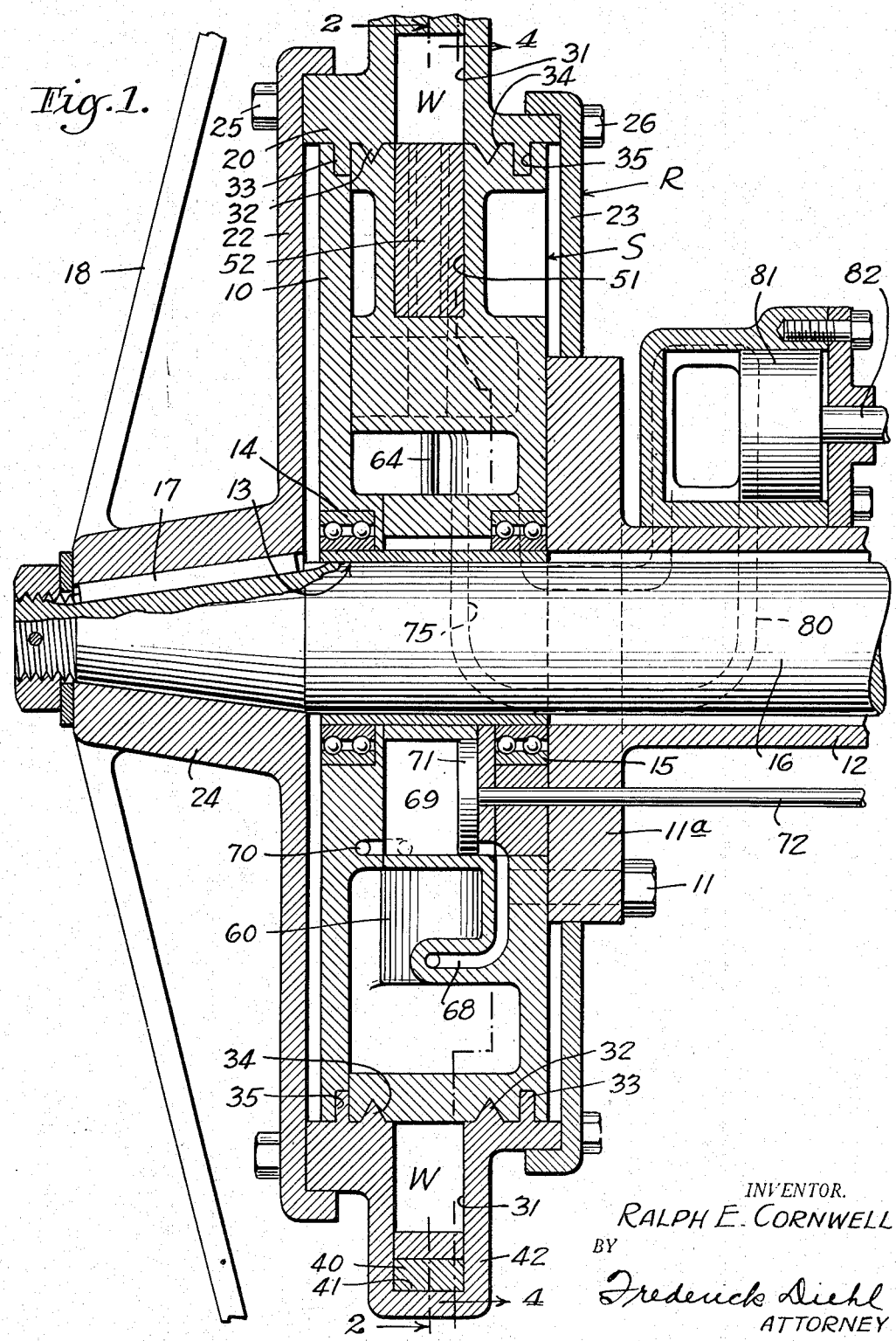
Figure 1 is a diametric, axial sectional view of one form of hydraulic braking mechanism embodying my invention.

Referring specifically to the drawings, my invention, in its present embodiment comprises a stator S and a rotor R, the stator being a generally cylindrical narrow body 10 secured by fastening members 11 to the flange 11a of an axle housing 12 or other support capable of rigidly securing the stator against rotation. Extending through the axial bore 13 of the stator and journaled in bearings 14 and 15 in the latter, is a driven shaft or axle 16, which, in the case of an automobile or other vehicle, has fixed to the outer projecting end thereof by a key 17, a wheel 18 of which the rotor R is a part.

The rotor R comprises an annular body 20 formed in two halves secured together by bolts 21. The inside diameter of the rotor body is such as to receive the outside diameter of the stator body 10 with a close fit therebetween. The rotor includes side plates 22 and 23 coacting with the rotor body 20 to enclose the stator S, the side plate 22 extending from the hub 24 of the wheel 18 and being secured to the rotor body by bolts 25, whereas the side plate 23 is secured to the rotor body by bolts 26 and has a central opening to receive the flange 11a of the axle housing 12, all as clearly shown in Figure 1.

The rotor body 20 has a relatively deep recess 31 co-acting with the periphery of the stator body 10 to define an annular working chamber W for the hydraulic liquid. At opposite sides of the working chamber the rotor body 20 is provided with annular sealing ribs 32 and 33 of V-shaped and rectangular cross sections, respectively, which have close fits in annular grooves 34 and 35 of complementary cross sections formed in the stator body 10, as also shown in Figure 1, all to the end of sealing the joint between the stator and rotor bodies against leakage of liquid from the working chamber W. It will also be noted that as the capacity of the working chamber is in the rotor body 20, the liquid filling the chamber will be held by centrifugal force in the rotor during rotation thereof, thus reducing to a minimum the tendency for liquid leakage from the system, and limiting any possible leakage to such times as pressure is developed in the system by a brake application or when the wheel is at rest.

Figure 9:
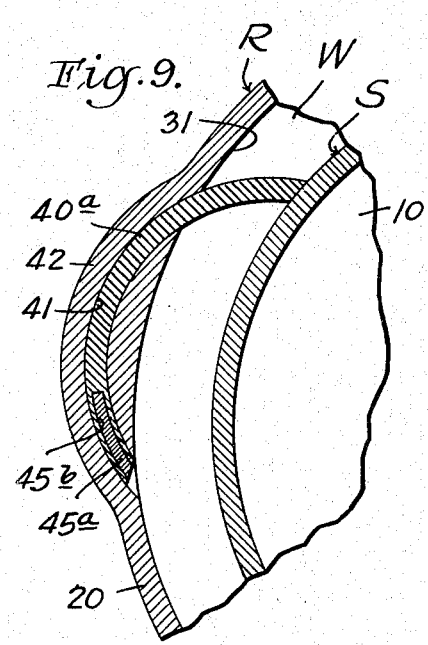
Figure 9 is a fragmentary sectional view illustrating a modified form of means for counteracting the effect of centrifugal force upon the vanes.

At equally spaced locations circumferentially, the rotor is provided with vanes 40 of segmental form which are slidably mounted in arcuate slots 41 formed in slight protuberances 42 on the periphery of the rotor. This mounting of the vanes enables them to be oscillated in the slots 41 from one extreme position to the other to accordingly dispose one end portion or the other of the vanes in spanning relation to the working chamber and in engagement with the periphery of the stator. Each vane is provided with notches 43 and 44, either of which is adapted to be entered by a spring-pressed ball 45 to releasably retain the vane in either extreme position against the tendency of centrifugal force to move the vane to a medial position when the rotor is rotating. In lieu of this latching means to counteract the effect of centrifugal force upon the vanes, there is shown in Figure 9 a modified construction which comprises a weight 45a such as a body of lead or other heavy metal which is fixed in a suitable bore 45b in that portion of each vane 40a which becomes the trailing end portion with respect to the direction of rotation of the rotor, so as to tend to urge the vane to the extreme position shown in this figure, when the vane is being acted on by centrifugal force.

The stator body 10 is provided with a relatively long and narrow slot 50 opening at the periphery of the body into the working chamber W, and intersected medially between its ends by a transversely extending radial slot 51 also opening at the periphery of the stator into the working chamber. A main valve 52 in the form of a plate, is slidably mounted in the slot 51 and is provided at opposite sides with wings 53 slidable in the slot 50 and having cam surfaces 54.

Figure 3:
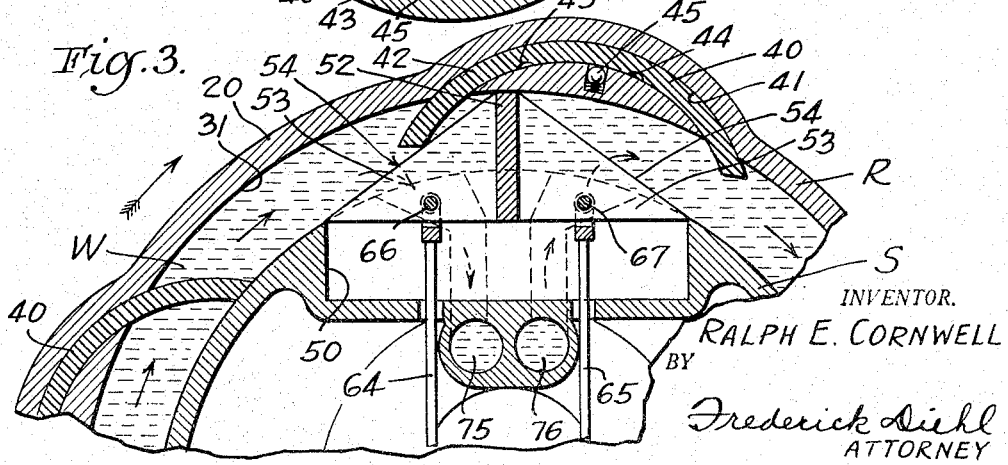
Figure 3 is a fragmentary sectional view similar to Figure 2, and illustrating the positions of the working parts when the brake is partly applied.

In the fully closed position of the valve 52 wherein the valve spans the working chamber W radially as shown in Figure 3, the cam surfaces 54 extend from a point of tangency at the periphery of the stator body to the outer end of the valve, as clearly shown in this figure, for co-action of one cam surface or the other with the vanes 40 in camming one end thereof and then the other clear of the working chamber so as to enable the rotor to rotate with the main valve 52 maintained in any operating position to fully closed position, as will be later fully described.

The valve 52 is actuated by a hydraulic actuating unit in the stator, which comprises a pair of cylinders 60 and 61 in which work pistons 62, 63 whose rods 64, 65 are connected at 66, 67 to the wings 53 of the valve 52. The cylinders 60, 61 are connected at one end by a passage 68 to one end of a master cylinder 69, and are connected at the other end by a passage 70 to the other end of the master cylinder.

Figure 8:
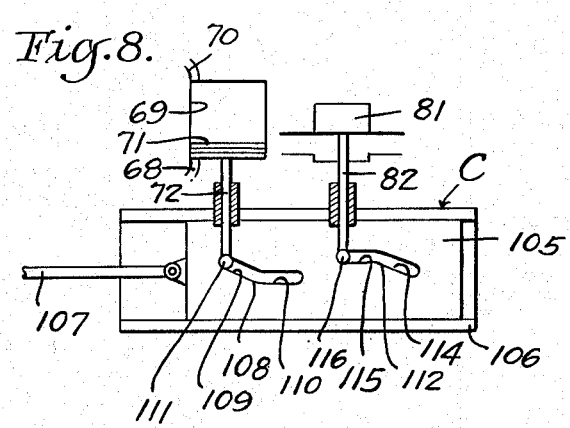
Figure 8 is a semi-diagrammatic view of a control device for the hydraulic valves of the braking mechanism.

Working in the master cylinder 69 is a piston 71 the rod 72 of which is actuated by a control device designated generally at C (Figure 8). For the present it will suffice to state that actuation of the master piston 71 in one direction will move the valve 52 from the open or non-operating position shown in Figure 2, to the closed or operating position shown in Figure 3, whereas movement of the piston in the opposite direction will effect reverse movement of the valve, all through the medium of the hydraulic liquid which fills all otherwise unoccupied space in the cylinders 60, 61 and 69, and the passages 68 and 70.

Figure 7:
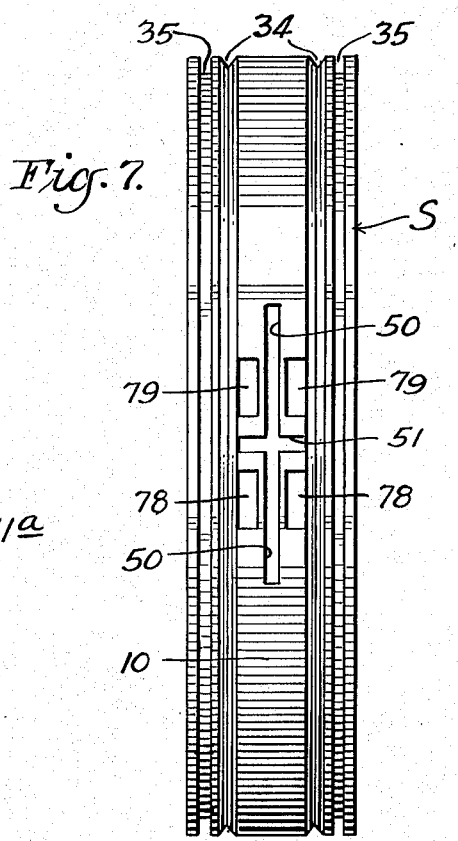
Figure 7 is a view of the rotor of the mechanism in side elevation.

The stator body 10 is also provided with independent by-pass passages 75 and 76 at opposite sides of the slot 50. The outer ends of the passages 75 and 76 open at the periphery of the stator body into the working chamber W to form pairs of ports 78 and 79 (Figure 7) at opposite sides of the valve 52, whereas their other ends respectively connect through the flange 11a of the axle housing 12 with the ends of an exteriorly located cooling conduit 80 provided with a by-pass valve 81 the rod 82 of which is also actuated by the control device C.

Figure 4:
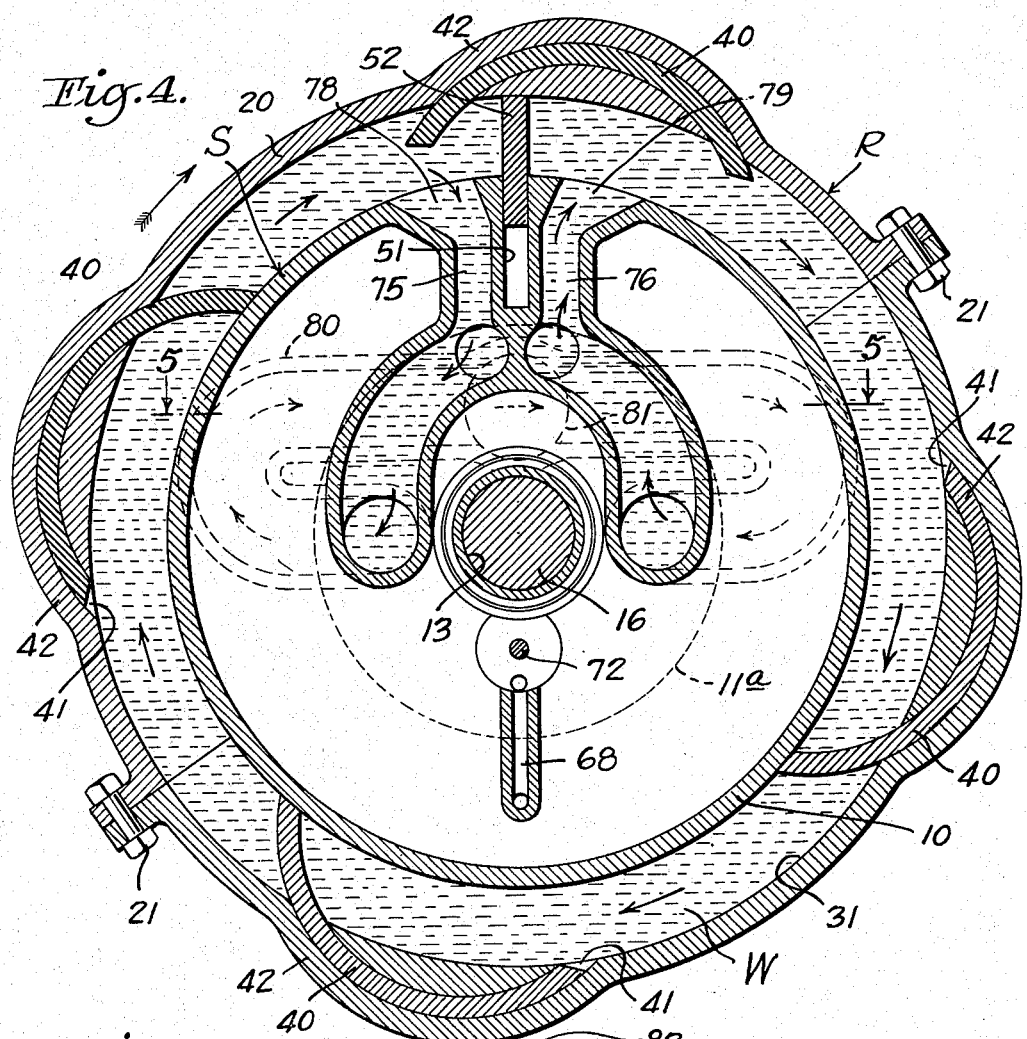
Figure 4 is a transverse sectional view taken on the line 4—4 of Figure 1, and showing the positions of the working parts corresponding to those in Figure 3.
Figure 5:
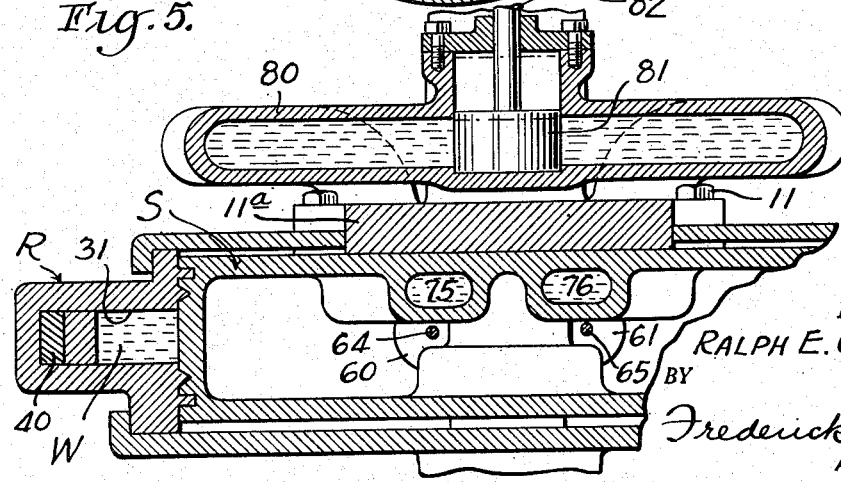
Figure 5 is a fragmentary sectional view taken on the line 5—5 of Figure 4, and showing in full lines the position of a by-pass valve when the brake is fully applied to produce a hydraulic lock.
Figure 6:
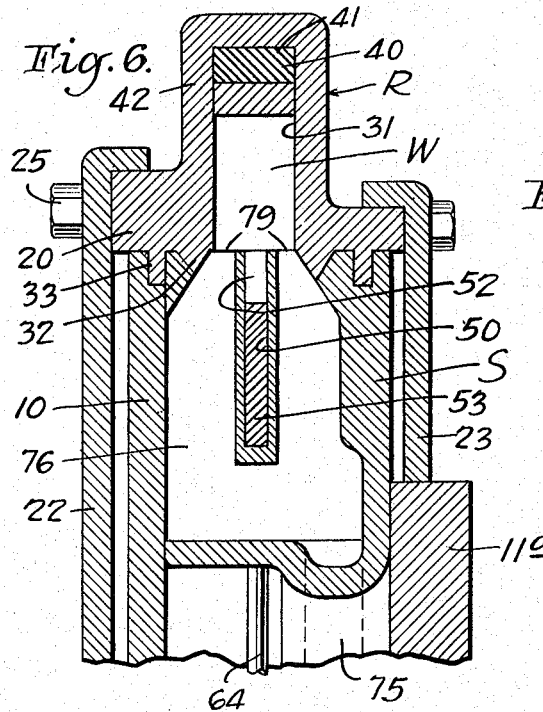
Figure 6 is a fragmentary sectional view taken on the line 6—6 of Figure 2.

With the main valve 52 closed as shown in Figure 4 and the by-pass valve 81 open as shown in broken lines in Figure 5, liquid in the working chamber W will be forced to pass around the main valve through the passages 75, 76 and the conduit 80 during rotation of the rotor, as indicated by the arrows in Figure 4.

Figure 2:
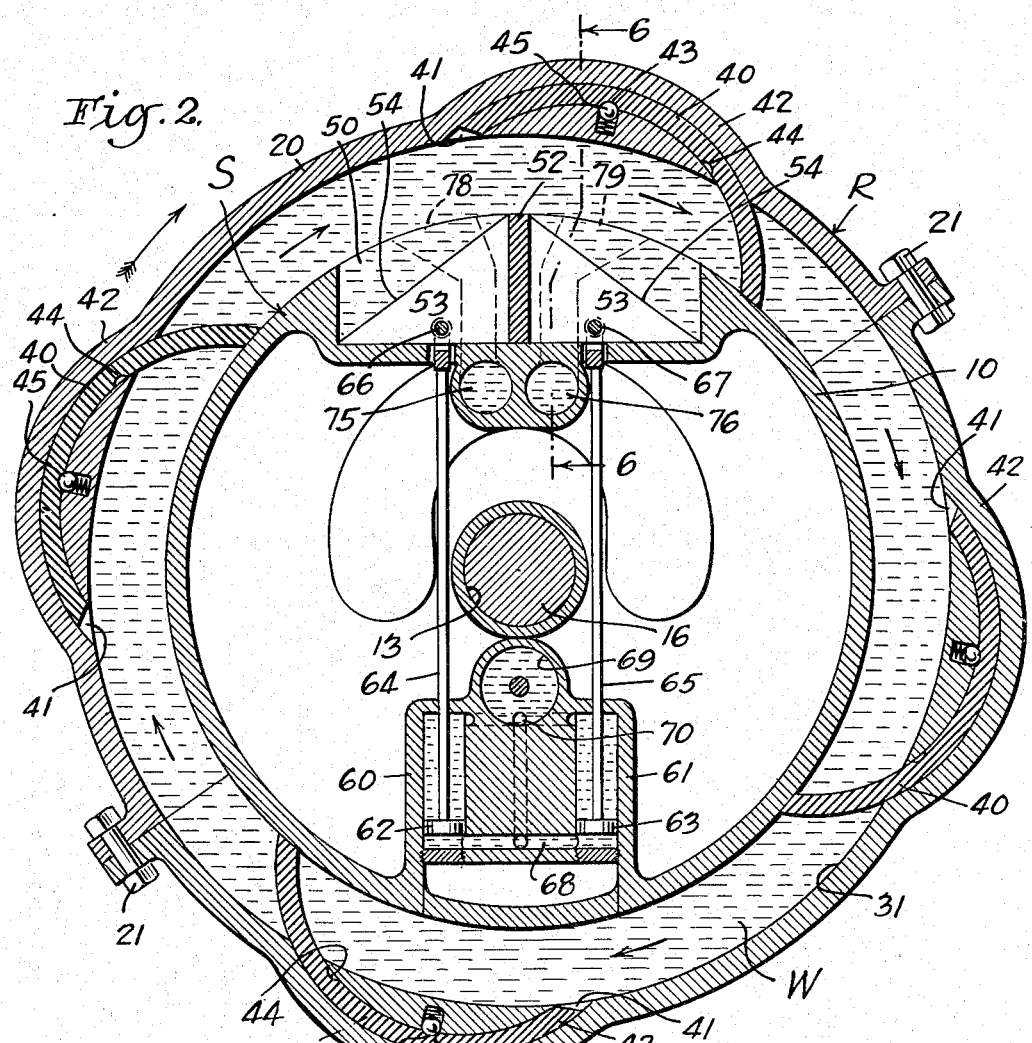
Figure 2 is a transverse sectional view taken on the line 2—2 of Figure 1 and illustrating the position of the working parts when the brake is fully released.

For the purpose of illustration, the control device C comprises a cam plate 105 reciprocably mounted in a guide 106 and adapted to be manually or otherwise actuated by a rod 107. The cam plate 105 is provided with a cam slot 108 having an active portion 109 and a dwell portion 110, in which works a roller 111 carried by the rod 72 of the piston 71. The cam plate 105 is further provided with a second cam slot 112 having an active portion 114 and a dwell portion 115 in which works a roller 116 carried by the rod 82 of the by-pass valve 81, for synchronized successive actuation of the piston 71 and valve 81 during the operation of the invention which is as follows:

In the position of the cam plate 105 shown in Figure 8, the main valve 52 and the by-pass valve 81 are fully open, thus permitting unrestricted rotation of the rotor R, as the vanes 40 merely circulate the liquid in the working chamber W as shown by the arrows in Figure 2, with but negligible fluid drag.

However, upon moving the cam plate 105 to the left, the piston 71 will first be moved in its cylinder 69 to initiate closing movement of the valve 52 from its fully open or non-operating position, and thus restrict circulation of the liquid in the working chamber W by the vanes 40, which latter are successively oscillated by one or the other of the cam surfaces 54 according as the rotor is rotating in one direction or the other, so as to pass by the valve 52 and then occupy the extreme position shown in Figures 2 and 4. This restricted circulation of the liquid forces part thereof through the restricting by-pass ports 78, 79, passages 75, 76 and cooling conduit 80, to the end that a braking action upon the rotor will be developed and will be increased as further closing movement of the main valve 52 is effected, until the fully closed position thereof shown in Figure 3 is reached.

Should this brake application, which may be termed a "service" application, be insufficient, continued movement of the cam plate 105 to the left will maintain the main valve 52 fully closed, while closing movement of the by-pass valve 81 will be initiated, to thus further restrict the flow of liquid through the by-pass ports 78, 79, passages 75, 76 and cooling conduit 80, and hence increase the braking action upon the rotor, until in the fully closed positions of the valves 52 and 81 all circulation of liquid will cease, so as to form a hydraulic lock upon the rotor against rotation thereof.

By now moving the cam plate 105 to the right, the reverse actuation of the valves 52 and 81 will be successively effected to release the brake as smoothly as it was previously applied. It will be evident that by rapidly actuating the valve 105 to the left from its original position shown in Figure 8, a maximum or "emergency" application of the brake can be smoothly and powerfully effected by the closing of the valves 52 and 81, and the rotor hydraulically locked against rotation.

Furthermore, it will be clear that by the provision of the simplified liquid by-pass system and the disposition of the cooling conduit 80 exteriorly of the machine so as to be subjected to the cooling action of atmospheric air, such heat as is generated by a brake application will be rapidly and effectively dissipated, thus insuring the working parts and the fluid against overheating.

I claim:

1. Hydraulic braking mechanism comprising: a stator; an annular rotor receiving the stator and co-acting therewith to define therebetween an annular working chamber for liquid; segmental shaped vanes mounted in the rotor for oscillatory movement from one extreme position to another to dispose one end portion or the other thereof in spanning relation to the working chamber for circulation of the liquid in the chamber by the vanes when the rotor is rotating; a main valve mounted in the stator for movement from a non-operating position to an operating position in the working chamber so as to oppose circulation of liquid in the latter by the vanes; said valve having a cam surface extending circumferentially of the stator and by which the vanes are oscillated from one extreme position to the other so as to permit the vanes to pass the valve when the latter occupies an operating position; and means by which a restricted circulation of liquid in the working chamber can be effected around the valve when in operating position, so as to produce a braking action upon the rotor.

2. Hydraulic braking mechanism comprising: a stator; an annular rotor receiving the stator and co-acting therewith to define therebetween an annular working chamber for liquid; segmental shaped vanes mounted in the rotor for oscillatory movement from one extreme position to another to dispose one end portion or the other thereof in spanning relation to the working chamber for circulation of the liquid in the chamber by the vanes when the rotor is rotating; a main valve mounted in the stator for movement from a non-operating position to an operating position in the working chamber so as to oppose circulation of liquid in the latter by the vanes; said valve having a cam surface extending circumferentially of the stator and by which the vanes are oscillated from one extreme position to the other so as to permit the vanes to pass the valve when the latter occupies an operating position; the stator having a by-pass communicating with said working chamber at opposite sides of said valve; a cooling conduit extending exteriorly of the mechanism so as to be exposed to the cooling effect of air or other means; said conduit being connected to said by-pass so as to form a by-pass circuit for the liquid; means for actuating said main valve; a by-pass valve by which circulation of liquid through said by-pass circuit can be varied to increase to braking action upon the rotor to the maximum of a hydraulic lock thereupon; and means for actuating the by-pass valve.

3. Hydraulic braking mechanism comprising: a stator; an annular rotor receiving the stator and co-acting therewith to define therebetween an annular working chamber for liquid; segmental shaped vanes mounted in the rotor for oscillatory movement from one extreme position to another to dispose one end portion or the other thereof in spanning relation to the working chamber for circulation of the liquid in the chamber by the vanes when the rotor is rotating; a main valve mounted in the stator for movement from a non-operating position to an operating position in the working chamber so as to oppose circulation of liquid in the latter by the vanes; said valve having a cam surface extending circumferentially of the stator and by which the vanes are oscillated from one extreme position to the other so as to permit the vanes to pass the valve when the latter occupies an operating position; the stator having a by-pass communicating with said working chamber at opposite sides of said valve; a cooling conduit extending exteriorly of the mechanism so as to be exposed to the cooling effect of air or other means; said conduit being connected to said by-pass so as to form a by-pass circuit for the liquid; a by-pass valve in said cooling conduit by which circulation of liquid through said by-pass circuit can be varied to increase the braking action upon the rotor to the maximum of a hydraulic lock thereupon; and control means for actuating the main and by-pass valves in successive order to first move the main valve from non-operating position to operating position, and then move the by-pass valve from open position to closed position with respect to said by-pass circuit.

4. Hydraulic braking mechanism comprising: a stator; a rotor co-acting with the stator to define therebetween an annular working chamber for a liquid; the rotor having arcuate slots whose lengths are in parallelism with the plane of rotation of the rotor; segmental vanes mounted in said slots for oscillatory movement from one extreme position to another to accordingly project one end portion or the other of said vanes into the working chamber for the circulation of liquid therein by the vanes when the rotor is rotated; a valve mounted for movement from a non-operating position to an operating position in the working chamber so as to oppose circulation of liquid therein by the vanes; means for moving the vanes clear of the valve when the latter is in operating position, so as to enable the vanes to pass the valve; and means for actuating the valve.

5. Hydraulic braking mechanism comprising: a stator; a rotor co-acting with the stator to define therebetween an annular working chamber for a liquid; the rotor having arcuate slots whose lengths are in parallelism with the plane of rotation of the rotor; segmental vanes mounted in said slots for oscillatory movement from one extreme position to another to accordingly project one end portion or the other of said vanes into the working chamber for the circulation of liquid therein by the vanes when the rotor is rotated; a valve mounted for movement from a non-operating position to an operating position in the working chamber so as to oppose circulation of liquid therein by the vanes; means for moving the vanes clear of the valve when the latter is in operating position, so as to enable the vanes to pass the valve; means defining a by-pass through which restricted circulation of liquid in the working chamber may be effected past the valve when in an operating position, so as to produce a braking action upon the rotor; and means for actuating the valve.

6. Hydraulic braking mechanism comprising: a stator; a rotor co-acting with the stator to define therebetween an annular working chamber for a liquid; the rotor having arcuate slots whose lengths are in parallelism with the plane of rotation of the rotor; segmental vanes mounted in said slots for oscillatory movement from one extreme position to another to accordingly project one end portion or the other of said vanes into the working chamber for the circulation of liquid therein by the vanes when the rotor is rotated; a valve mounted for movement from a non-operating position to an operating position in the working chamber so as to oppose circulation of liquid therein by the vanes; means for moving the vanes clear of the valve when the latter is in operating position, so as to enable the vanes to pass the valve; the stator having by-pass ports respectively communicating with the working chamber at opposite sides of said valve; means including a cooling conduit extending exteriorly of the mechanism for exposure to the air or other cooling means, by which said by-pass ports are connected to define a by-pass liquid circuit; a by-pass valve in the last means for controlling said by-pass circuit; and means for actuating the first said valve and said by-pass valve in successive order.

7. Hydraulic braking mechanism comprising: a stator; an annular rotor receiving the stator and co-acting therewith to define therebetween an annular working chamber for liquid; the rotor having arcuate slots whose lengths are in parallelism with the plane of rotation of the rotor; segmental vanes mounted in said slots for oscillatory movement from one extreme position to another to accordingly project one end portion or the other of said vanes into the working chamber for circulation of liquid therein by the vanes when the rotor is rotating; the periphery of the stator having a circumferentially extending slot and a transverse slot in intersecting relation, with both slots opening into the working chamber; a valve reciprocably mounted in said transverse slot to occupy a non-operating position therein and operating positions in the working chamber; means carried by the stator, co-acting with the vanes to move the latter clear of the valve when in operating position, so as to enable the vanes to pass the valve; and means for actuating the valve.

8. Hydraulic braking mechanism comprising: a stator; an annular rotor receiving the stator and co-acting therewith to define therebetween an annular working chamber for liquid; the rotor having arcuate slots whose lengths are in parallelism with the plane of rotation of the rotor; segmental vanes mounted in said slots for oscillatory movement from one extreme position to another to accordingly project one end portion or the other of said vanes into the working chamber for circulation of liquid therein by the vanes when the rotor is rotating; the periphery of the stator having a circumferentially extending slot and a transverse slot in intersecting relation, with both slots opening into the working chamber; a valve reciprocably mounted in said transverse slot to occupy a non-operating position therein and operating positions in the working chamber; means carried by the stator, co-acting with the vanes to move the latter clear of the valve when in operating position, so as to enable the vanes to pass the valve; the stator having by-pass ports respectively communicating with the working chamber at opposite sides of said valve; means including a cooling conduit extending exteriorly to the mechanism for exposure to the air or other means, by which said by-pass ports are connected to define a by-pass liquid circuit; a by-pass valve in the last means for controlling said by-pass circuit; and means for actuating the first said valve and said by-pass valve in successive order.

9. Hydraulic braking mechanism comprising: a stator; an annular rotor receiving the stator and co-acting therewith to define therebetween an annular working chamber for liquid; the rotor having arcuate slots whose lengths are in parallelism with the plane of rotation of the rotor; segmental vanes mounted in said slots for oscillatory movement from one extreme position to another to accordingly project one end portion or the other of said vanes into the working chamber for circulation of liquid therein by the vanes when the rotor is rotating; the periphery of the stator having a circumferentially extending slot and a transverse slot in intersecting relation, with both slots opening into the working chamber; a valve reciprocably mounted in said transverse slot to occupy a non-operating position therein and operating positions in the working chamber; a wing projecting from a side of said valve and working in said circumferentially extending slot; said wing having a cam surface extending from the outer end of said valve to a point of tangency with the periphery of the stator when the valve occupies its extreme operating position, for co-action with the vanes in oscillating the latter first from one extreme position to the other and then vice versa during rotation of the rotor, so as to enable the vanes to pass the valve; and means for actuating the valve.

RALPH E. CORNWELL.

REFERENCES CITED

The following references are of record in the file of this patent:

UNITED STATES PATENTS

| Number | Name | Date |
| --- | --- | --- |
| 1,501,444 | English et al. | July 15, 1924 |
| 2,492,868 | Johnson | Dec. 27, 1949 |

FOREIGN PATENTS

| Number | Country | Date |
| --- | --- | --- |
| 509,953 | Great Britain | July 25, 1939 |
| 512,389 | Great Britain | Sept. 1, 1939 |